Dec. 16, 1969    J. H. HOLLYDAY    3,483,688
CHOPPER AND BALER ASSEMBLY

Filed Jan. 6, 1967    4 Sheets-Sheet 1

INVENTOR.
JAMES H. HOLLYDAY
BY
Donald D. Schaper
ATTORNEY

Dec. 16, 1969  J. H. HOLLYDAY  3,483,688
CHOPPER AND BALER ASSEMBLY
Filed Jan. 6, 1967  4 Sheets-Sheet 2

INVENTOR
JAMES H. HOLLYDAY
BY Donald D. Schaper
ATTORNEY

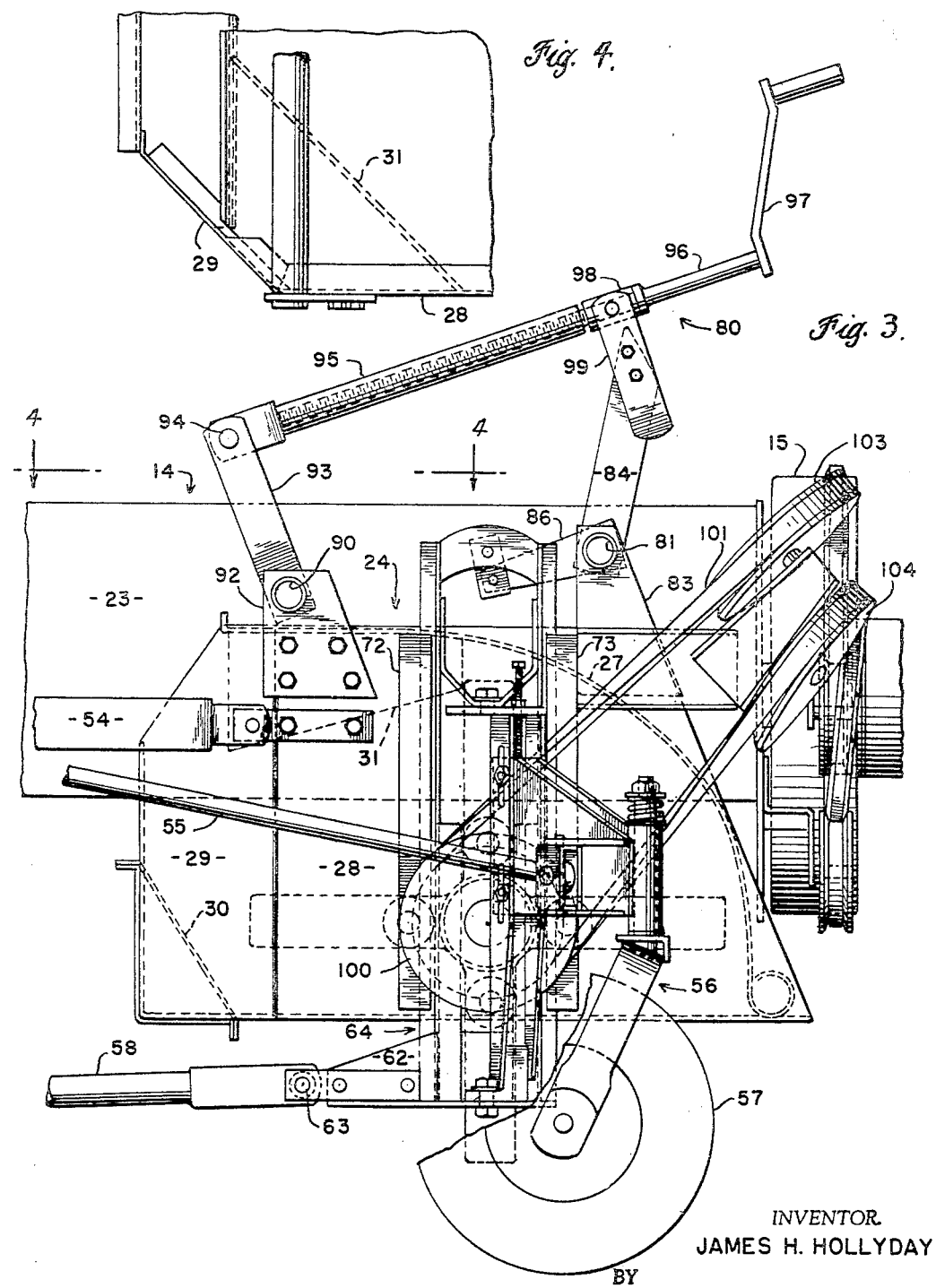

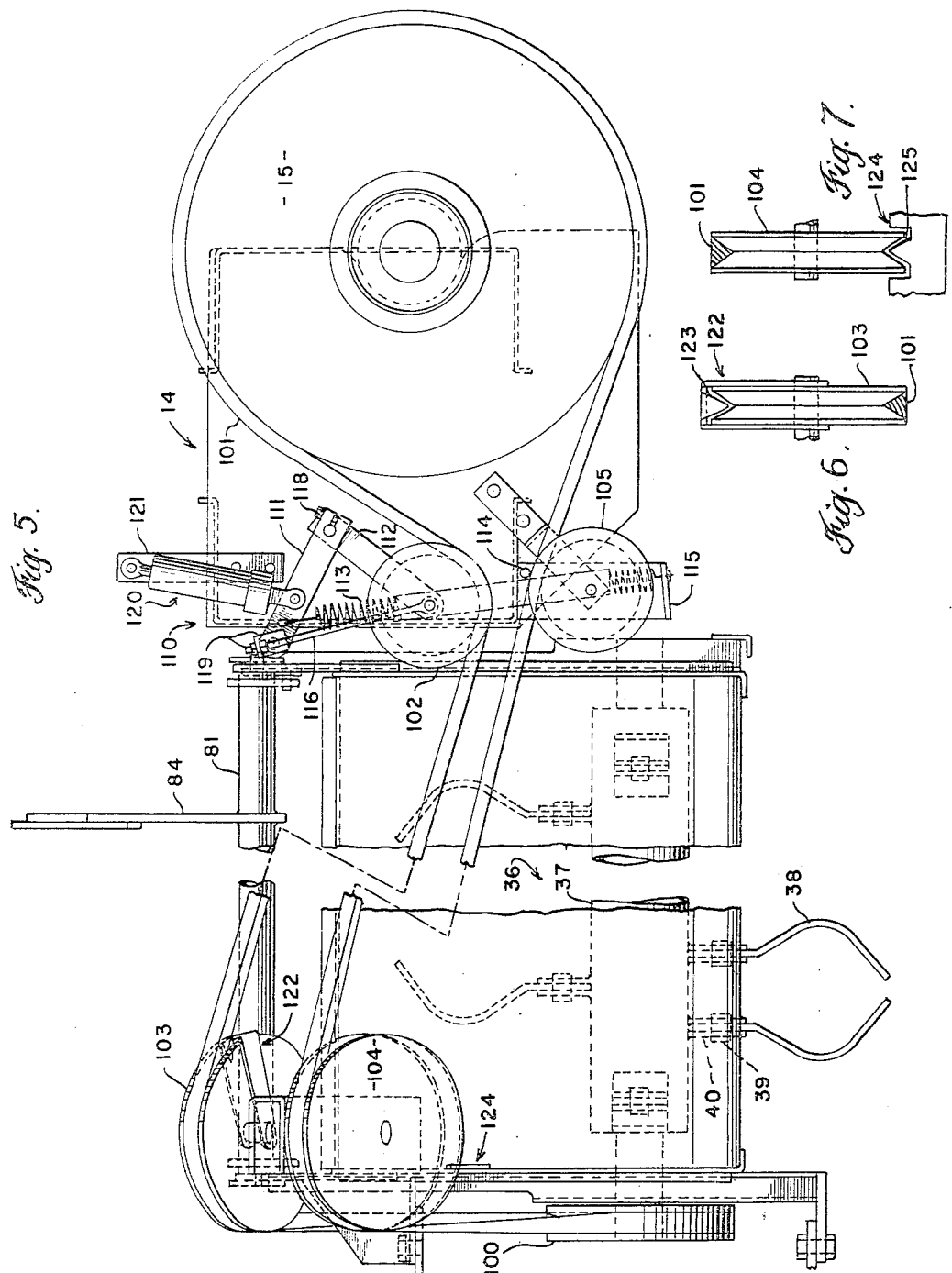

United States Patent Office 3,483,688
Patented Dec. 16, 1969

3,483,688
CHOPPER AND BALER ASSEMBLY
James H. Hollyday, New Holland, Pa., assignor to Sperry Rand Corporation, New Holland, Pa., a corporation of Delaware
Filed Jan. 6, 1967, Ser. No. 607,735
Int. Cl. A01d 39/00; F16h 7/12
U.S. Cl. 56—341               3 Claims

ABSTRACT OF THE DISCLOSURE

An agricultural machine having a rotary flail-type cutter for cutting standing crop material from the field and a baler for forming the material into bales in which the cutter is driven from the baler drive systems.

BACKGROUND OF THE INVENTION

This invention is particularly applicable to a drive system for a chopper unit in a chopper and baler assembly.

A relatively recent development in the harvester art has been a machine which is adapted to cut and/or collect crop material from a field and form it into bales. In most machines of this type, a chopper unit is detachably mounted to a conventional pick-up baler. There are two general arrangements for mounting the chopper unit to the baler. In one arrangement, the rotatable pick-up is removed from the baler, and a chopper unit is mounted in place of the pick-up. In the other arrangement, the chopper is mounted forwardly of the baler pick-up, and the crop material is directed over the pick-up and into the baler.

The chopper unit in machines of the type described above is normally driven by a drive mechanism operatively connected to the baler drive system. The baler and chopper assembly is ordinarily used only a few days out of the year; and for the remainder of the year, the baler unit is used as a conventional pick-up baler. Thus, it is important to the farmer to have a chopper unit drive system which requires a minimum of time and effort to attach and detach from the baler. Further, since the use of the chopper unit is limited, the drive system must be simple and inexpensive to manufacture.

SUMMARY OF THE INVENTION

This invention is directed to a drive system for powering a chopper unit connected to a baler unit. In the disclosed chopper unit drive, a single continuous drive belt extends laterally from the baler flywheel to the outboard side of the chopper where it is directed rearwardly by guide sheaves to a drive sheave on the chopper rotor central shaft. A spring biased idler pulley is mounted on the baler bale case adjacent the inboard side wall of the chopper to tension the drive belt. A dashpot is operatively connected to the idler pulley to dampen the movements of the idler pulley, and thereby compensate for sudden loads imposed on the chopper drive system.

A principal object of this invention is to provide an improved drive means for a chopper unit in a baler and chopper assembly.

Another object of this invention is to provide a novel belt tensioning means in a chopper unit drive system.

Another object of this invention is to provide a drive means for a chopper unit in a machine of the type described which is powered by a single continuous belt.

A further object of this invention is to provide a drive system for a chopper unit in a machine of the type described which can be connected and disconnected with a minimum of effort.

A still further object of this invention is to provide a chopper unit drive system which has fewer parts than conventional drives and is thus less expensive to manufacture.

Other objects and advantages of this invention will be apparent hereinafter from the specification and from the recital in the appended claims.

DESCRIPTION OF THE DRAWINGS

FIG. 3 is an enlarged fragmentary elevational view, as viewed from the left in FIG. 2;

FIG. 4 is a fragmentary plan view, taken as indicated by the line 4—4 of FIG. 3;

FIG. 5 is a front view of the chopper drive system, with a portion broken out to condense the figure, and showing the belt tensioning means;

FIG. 6 is a detailed view of the upper guide sheave and showing the sheave guard; and FIG. 7 is a detailed view of the lower guide sheave with the guard device which functions in conjunction with this sheave.

DESCRIPTION OF THE PREFERRED EMBODIMENT

Figure 1:
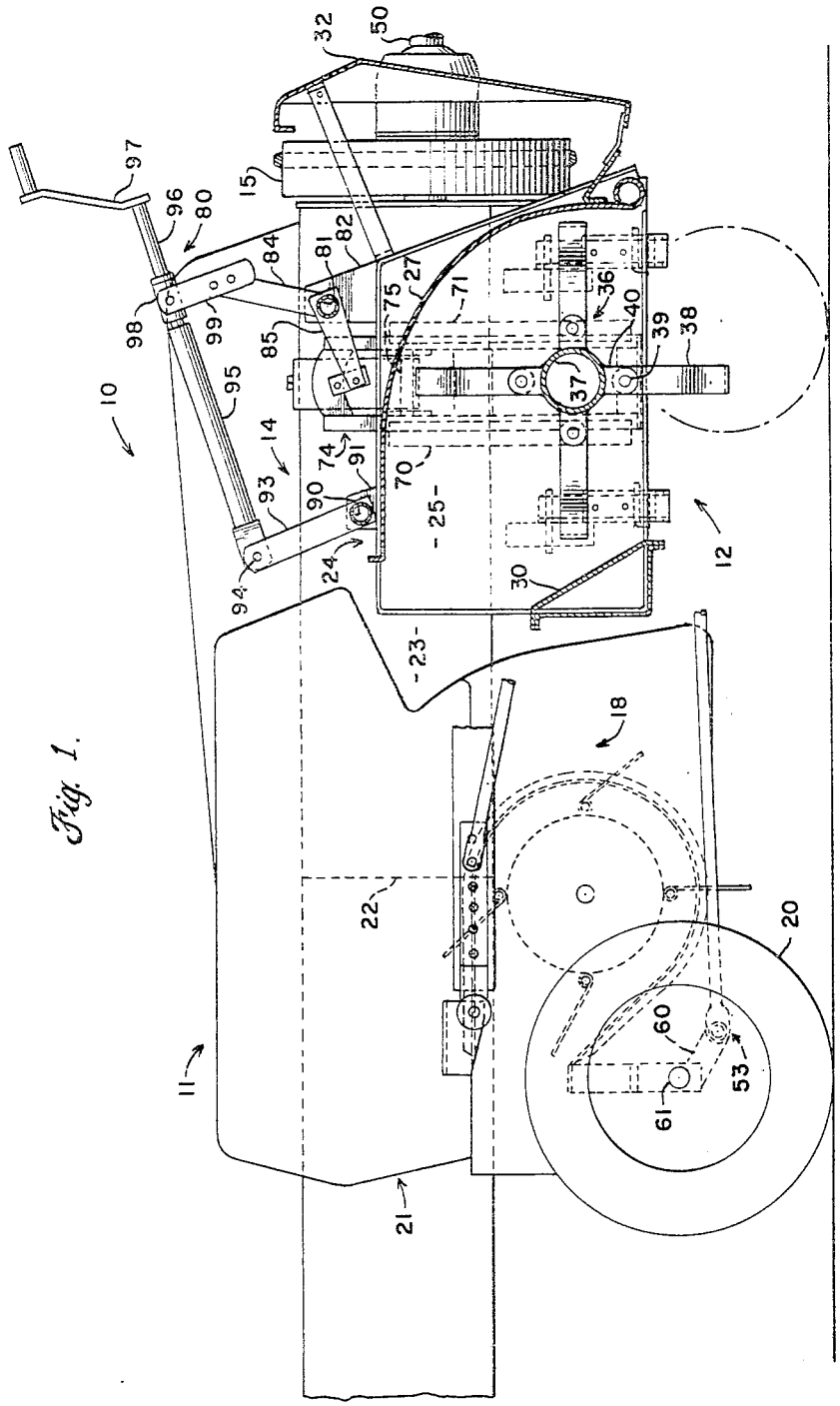
FIG. 1 is a sectional elevational view of the machine, taken approximately on the line 1—1 of FIG. 2, showing the baler unit and chopper unit mounted thereto.

Referring now to the drawings by numerals of reference and particularly to FIG. 1, a machine of this invention is designated generally 10. Machine 10 comprises a baler unit 11 of conventional construction and a chopper unit 12.

Baler unit 11 comprises a bale case 14, a reciprocating plunger, not shown, movable in the bale case, a flywheel 15 mounted on the forward end of bale case 14 for driving the plunger through a gearbox 16, a rotatable pick-up 18, and ground wheels 19 and 20. Feed chamber 21 is located rearwardly of pick-up 18 and is in communication with a feed opening 22 in an upright side wall 23 of bale case 14. Feeder means, not shown, sweep crop material across the floor of feed chamber 21 and into the bale case. An example of the type of feeder means referred to is shown in U.S. Patent to Nolt et al. 3,115,823. It will be apparent to those skilled in the art that crop material fed into the bale case through feed opening 22 is compressed by the reciprocating plunger and formed into bales, and tying means, not shown, serve to bind the crop material with wire or string.

Chopper unit 12 comprises a housing 24 having an open bottom and including an inboard side wall 25 adjacent the bale case 14, an outboard side wall 26 laterally spaced from the inboard side wall, and an arcuate top wall 27 extending between and joining the side walls. Outboard side wall 26 is formed from a generally fore-and-aft extending forward wall portion 28 and an inwardly extending rear wall portion 29. At the rear end of housing 24, a reinforcing member 30 extends between the side walls 25 and 26.

Deflector means, as shown in FIG. 4, comprises wall portion 29 and a deflector plate 31 which extends downwardly from top wall 27 and is fixed thereto, as by welding. Deflector plate 31 is generally parallel to rear wall portion 29 and cooperates with the wall portion to guide crop material inwardly toward pick-up 18. At the forward end of the chopper housing, a vertically extending shield 32 is mounted to engage standing crop material and direct the material into the chopper housing. Shield 32 is spaced from the housing 24, as shown in FIG. 2, to allow trash which passes over the shield to fall through to the ground.

Figure 2:
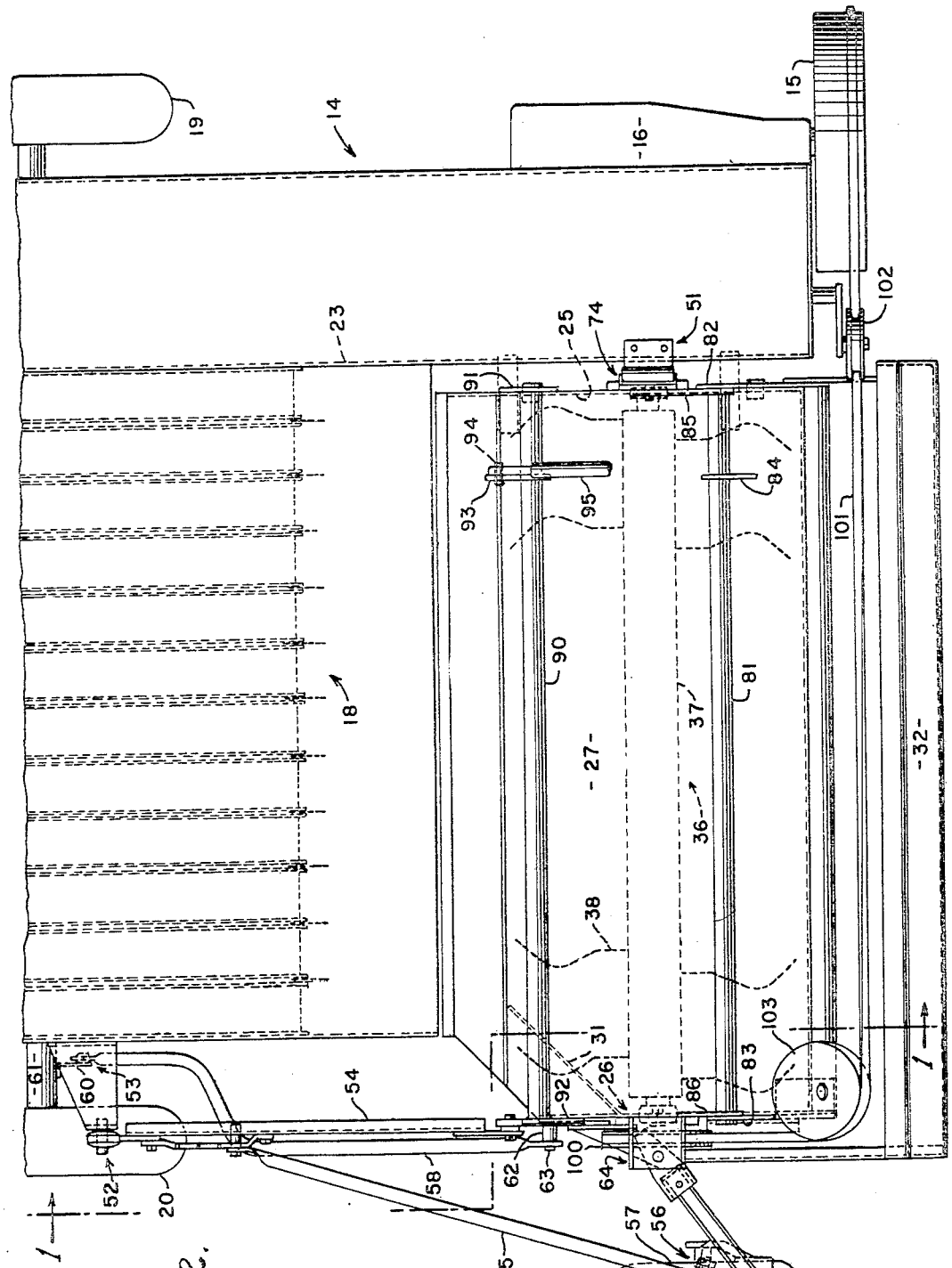
FIG. 2 is a plan view of the machine, substantially as shown in FIG. 1, showing the drive system for the chopper unit.

A chopper rotor 36, as shown in FIGS. 1-3, is journalled in side walls 25 and 26 and comprises a central shaft 37, and a plurality of flail-like chopper knives 38. Chopper knives 38 are pivotally mounted on bars 39. Bars 39 are removably mounted in lugs 40 which are fixed to shaft 37 and extend radially therefrom.

Chopper 12 is removably attached to baler 11 by a first connection 51 on bale case 14 and by connections 52 and 53, located at the outboard side of the machine. A channel member 54 extends between pin connection 52 and chopper housing 24. A first push rod 55 is adjustaby connected to bar 54 adjacent pin connection 52, and at its forward end rod 55 is connected to mounting bracket 56 on castor wheel 57. A second push rod 58 is connected by pin connection 53 to an element 60 fixed to baler axle 61, and at its forward end, it is connected to mounting 62 by a pin 63. Mounting 62 is an integral part of slider plate 64.

Support means for chopper housing 24 comprises a first pair of guide tracks 70 and 71 mounted on inboard side wall 25, and a second pair of guide tracks 72 and 73 mounted on outboard side wall 26. Guide tracks 70 and 71 are adapted to slidably receive a plate 74 at the chopper inboard end, and tracks 72 and 73 slidably receive plate 64 at the outboard end. Plate 74 is removably connected to bale case 14 by means of a pin 75. Plate 64 is connected to wheel mounting bracket 56 which is supported by wheel 57.

A lift system 80 is mounted on chopper housing 24 and provides for movement of the housing relative to plates 74 and 64 to effect a vertical adjustment of the chopper. Lift system 80 comprises rockshaft 81 pivotally mounted in brackets 82 and 83 at the forward end of the chopper. An upwardly extending arm 84 carried on rockshaft 81 is connected to actuating means for pivoting the rockshaft. A lever 85 connects rockshaft 81 to plate 74 and a lever 86 connects the rockshaft to plate 64 at the outboard side of the machine. At the rear end of the chopper a stationary tube 90 is mounted to chopper housing 24 by means of elements 91 and 92. A radial member 93 extends upwardly from tube 90 and at its upper end is connected at 94 to an internally threaded cylinder 95. A screw rod 96 having a handle 97 is threadably received in cylinder 95. A collar 98 is fixed against axial movement on rod 96 and is pivotally connected to an element 99 on arm 84. It will be apparent that when rod 96 is rotated by turning handle 97, rockshaft 81 will be caused to pivot. The pivotal movement of rockshaft 81 will move the chopper housing and rotor carried thereby in a vertical direction, the direction of movement depending on the direction of rotation of the screw rod 96.

Chopper rotor 36 is powered through a drive sheave 100 which is secured to the outboard end of the rotor central shaft 37 and is driven by means of a continuous belt 101 connected to flywheel 15. From flywheel 15, belt 101 extends under an idler pulley 102, around a first guide sheave 103 on housing 24 at the outboard end thereof, and then to drive sheave 100; from sheave 100, belt 101 moves under a second guide sheave 104 mounted on housing 24 and located directly under guide sheave 103, over a second idler pulley 105 and back to flywheel 15. Flywheel 15 receives its power through a P.T.O. shaft 50, shown fragmentarily in FIG. 1, which is connected to the tractor, not shown.

A belt tensioning means 110, best shown in FIG. 5, acts through idler pulley 102 to maintain the proper tension in belt 101. Belt tensioning means 110 comprises a first arm 111 pivotally mounted on bale case 14, a second arm 112 which pivotally carries pulley 102 and is fixed to arm 111, and a spring 113 fixed to arm 111 and to a bracket 115 on bale case 14. The angle of arm 112 relative to arm 111 is fixed by a rod 116; this angle can be adjusted by first loosening lock screw 118, and then turning lock nuts 119 to move idler pulley 102 in the desired direction. A dashpot 120 is connected between arm 111 and a bracket 121 on bale case 14 and serves as a dampener for the belt tensioning means. A pin 114, which extends through bracket 115, prevents belt 101 from coming out of idler pulley 105.

As shown in FIGS. 5-7, a guard 122 having a projection 123 is mounted on guide sheave 103 for keeping foreign material from entering the sheave and interfering with the drive mechanism. A plate 124 having a projection 125 serves the same purpose for guide sheave 104.

In operation, machine 10 is drawn through a field in a forward direction by a tractor, not shown. The various components of the chopper and the baler units are driven by the tractor power take-off through P.T.O. shaft 50. Chopper knives 38 serve to sever the crop material, fling it upwardly and rearwardly to the baler pick-up 18. The baler pick-up 18 slows the crop material down, aligns it, and uniformly delivers it to feed chamber 21. From the feed chamber, the stalks are fed into the bale case where they are compressed and formed into bales.

An important aspect of the disclosed chopper drive system is the tensioning and guide means which make it possible to use a single continuous belt 101 to drive chopper rotor 36. By the use of a single belt, the drive system can be easily connected and disconnected. The belt tensioning means 110 effectively keeps belt 101 from coming off of the sheaves when sudden loads or other factors cause increased stretching in the belt. Guard 122 and plate 124 keep the guide sheaves free of foreign material.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains.

Having thus described my invention, what I claim is:

1. An agricultural machine adapted to travel in a forward direction over a field of crops, said machine comprising:

a bale case on one side of the machine, said bale case extending generally in a fore-and-aft direction and having an upright side wall with a feed opening therein;

a flywheel on said bale case at a forward end thereof and adapted to receive power from a power take-off;

a feed chamber extending laterally outward from said bale case, said feed chamber being in communication with said feed opening and having an outboard end spaced laterally from said upright side wall;

a chopper housing and rotor position forwardly of said feed chamber, means for detachably mounting said chopper housing and rotor on said machine to permit vertical adjustment of said chopper housing and rotor, said housing having inboard side walls adjacent said bale case and an outboard side wall spaced laterally therefrom, said side walls being joined by a laterally extending top wall;

said chopper rotor journalled in said side walls, said rotor comprising a central shaft with a plurality of flail-like elements axially spaced on said shaft, said rotor being rotatable to cause said elements to collect crop material from the field and sweep the material upwardly and rearwardly; and drive means
  having a pulley mounted on the outboard end of said central shaft,
  guide sheaves mounted at the front of said chopper housing adjacent said outboard side wall,
  endless belt means extending around said flywheel laterally across the front of said chopper housing and over said guide sheaves for guiding said endless belt means from a lateral direction to a fore-and-aft direction around said outboard mounted chopper pulley to drive said chopper rotor from said forward end mounted flywheel and having belt tensioning means mounted on said bale case adjacent the inboard side of said chopper housing to form a lateral span of said belt corresponding to the lateral length of said chopper housing and rotor including a roller, means variably mounting said roller, a spring forcing said roller into engagement with said endless belt means and dashpot type dampener means connected to said variable mounting means to dampen the movement of said pulley on sudden loads.

2. An agricultural machine, as recited in claim 1, wherein said variable mounting means comprises an adjustable arm means pivotally mounted on said bale case with said roller rotatably carried by said arm means for adjusting the position of said roller, and with said spring connected between said arm means and said bale case, and said dampener means is connected between said arm means and said bale case.

3. In a combination with a baler having a longitudinally extending bale case with a flywheel on front for connection to a power take-off and having a chopper detachably mounted in vertically adjustable relation on said bale case and with a rotor extending laterally to said bale case forming inboard and outboard ends, a pulley on the outoard end of said rotor, guide sheaves on said chopper adjacent the outboard end and a single belt around said flywheel and extending laterally across the front of said chopper and around said pulley for rotating said chopper; belt tensioning means mounted on said bale case adjacent the inboard side of said chopper to form a lateral span of said belt means corresponding to the lateral length of said chopper and includes an adjustable pivotally mounted arm, a roller rotatably mounted on said arm, a spring connected between said bale case and arm for resiliently urging said roller against said belt and dashpot type dampening means connected between said arm and said bale case to dampen the movement of said pulley on sudden loads.

References Cited

UNITED STATES PATENTS

| 1,283,309 | 10/1918 | Roby | 74—242.11 |
| 1,667,117 | 4/1928 | Ireland | 74—242.11 |
| 2,044,719 | 6/1936 | Stegeman | 74—242.11 |
| 2,560,307 | 7/1951 | Slemmons | 74—230 |
| 2,674,839 | 4/1954 | Russell | 56—341 |
| 2,751,745 | 6/1956 | Magee | 56—372 |
| 3,329,561 | 7/1967 | Rojecki et al. | 74—242.11 X |
| 3,362,144 | 1/1968 | Bumgardner | 56—341 X |
| 2,954,726 | 10/1960 | Kerridge | 74—242.11 X |

FOREIGN PATENTS 1,021,895   3/1966   Great Britain.

ANTONIO F. GUIDO, Primary Examiner

PASQUALE A. RAZZANO, Assistant Examiner

U.S. Cl. X.R.

74—242.11